(12) United States Patent
Nunn et al.

(10) Patent No.: US 8,978,590 B2
(45) Date of Patent: Mar. 17, 2015

(54) PET TOY WITH CORE ASSEMBLY INCORPORATING NOISE MAKING FEATURE

(75) Inventors: Sam Nunn, Irvine, CA (US); Zhan Feng Chen, Shengzhen (CN)

(73) Assignee: The Kong Company, LLC, Golden, CO (US)

( * ) Notice: Subject to any disclaimer, the term of this patent is extended or adjusted under 35 U.S.C. 154(b) by 325 days.

(21) Appl. No.: 12/904,894

(22) Filed: Oct. 14, 2010

(65) Prior Publication Data
US 2012/0090554 A1    Apr. 19, 2012

(51) Int. Cl.
A01K 15/02    (2006.01)

(52) U.S. Cl.
CPC .................................. *A01K 15/025* (2013.01)
USPC .......................................... 119/707; 119/709

(58) Field of Classification Search
USPC .......... 119/707, 708, 709, 711; 446/184, 213, 446/397, 216, 297, 409
IPC ............................................. A01K 15/02,29/00
See application file for complete search history.

(56) References Cited

U.S. PATENT DOCUMENTS

| | | | |
|---|---|---|---|
| 3,943,643 A | 3/1976 | Fisher et al. | |
| 4,223,636 A * | 9/1980 | Dishong | 119/709 |
| 4,399,632 A | 8/1983 | Iseki | |
| 4,534,316 A | 8/1985 | Bowlsby | |
| 4,571,208 A | 2/1986 | Saigo et al. | |
| 4,973,286 A | 11/1990 | Davison | |
| 5,078,637 A | 1/1992 | McFarland | |
| 5,758,604 A * | 6/1998 | Jørgensen | 119/711 |
| 6,014,950 A | 1/2000 | Rogers | |
| 6,110,001 A | 8/2000 | Chae | |
| 6,112,703 A * | 9/2000 | Handelsman | 119/707 |
| 6,123,599 A * | 9/2000 | Chiang | 446/397 |
| 6,216,640 B1 | 4/2001 | Zelinger | |
| 6,360,693 B1 | 3/2002 | Long, III | |
| 6,439,950 B1 | 8/2002 | Goldman et al. | |
| 6,470,830 B2 | 10/2002 | Mann | |
| 6,557,494 B2 | 5/2003 | Pontes | |
| 6,609,944 B1 | 8/2003 | Viola | |
| 6,663,457 B2 | 12/2003 | Ritchey | |
| 6,679,927 B2 | 1/2004 | Strongin | |

(Continued)

OTHER PUBLICATIONS

International Search Report and Written Opinion for International Patent Application No. PCT/US2011/055860 mailed Jan. 13, 2012, 10 pages.

*Primary Examiner* — Rob Swiatek
*Assistant Examiner* — Kathleen Alker
(74) *Attorney, Agent, or Firm* — Sheridan Ross P.C.

(57) ABSTRACT

A pet toy has a core assembly incorporating a noise making feature. The pet toy has a flexible, elastomeric body that flexes in response to external pressure placed on the toy by an animal. The core assembly extends through the interior of the pet toy and is secured at opposite ends of the pet toy. In one preferred embodiment, the pet toy is a round shaped ball in which the core assembly extends across a diameter of the ball. The core assembly has a bore and a noise making device is secured to a housing that extends from a central shaft of the bore. Airflow is facilitated through the pet toy for activation of the noise making device by deformation of the body of the pet toy. As the pet toy is deformed by the biting action of an animal, air is forced through the noise making device, thereby creating sound. In another embodiment, the core assembly has a compound shape including a bulbous portion securing the noise making housing.

22 Claims, 6 Drawing Sheets

(56) References Cited

U.S. PATENT DOCUMENTS

| | | |
|---|---|---|
| 6,786,792 B2 | 9/2004 | Ritchey |
| 6,892,674 B1 * | 5/2005 | Dubinins et al. ............... 119/707 |
| 6,935,274 B1 | 8/2005 | Rothschild |
| 6,981,471 B1 | 1/2006 | Dubinins et al. |
| 7,063,044 B2 * | 6/2006 | Handelsman et al. ........ 119/709 |
| 7,066,779 B2 | 6/2006 | Willinger |
| 7,100,539 B2 | 9/2006 | Levan |
| 7,144,293 B2 | 12/2006 | Mann et al. |
| 7,169,008 B2 | 1/2007 | Ritchey |
| 7,201,117 B2 * | 4/2007 | Ritchey et al. ................ 119/709 |
| 7,207,294 B2 | 4/2007 | Stasio |
| 7,264,533 B2 | 9/2007 | Chan et al. |
| D552,307 S | 10/2007 | Renforth et al. |
| 7,343,878 B2 | 3/2008 | Ritchey et al. |
| 7,363,880 B2 | 4/2008 | Ritchey et al. |
| 7,455,033 B2 | 11/2008 | Curry |
| 7,513,220 B2 | 4/2009 | Ragonetti et al. |
| 7,574,977 B2 | 8/2009 | Ritchey |
| 7,587,993 B2 | 9/2009 | Jager |
| 7,597,065 B2 | 10/2009 | Jager |
| 7,600,488 B2 | 10/2009 | Mann |
| 7,644,684 B2 | 1/2010 | Ritchey |
| 7,665,423 B2 | 2/2010 | Ritchey et al. |
| 7,722,428 B2 | 5/2010 | Di Lullo |
| 7,736,212 B2 | 6/2010 | Willinger |
| 7,736,213 B2 | 6/2010 | Willinger et al. |
| 7,762,214 B2 | 7/2010 | Ritchey |
| 7,810,455 B2 * | 10/2010 | Axelrod et al. ................ 119/709 |
| 7,833,079 B2 | 11/2010 | Willinger et al. |
| 7,950,353 B2 * | 5/2011 | Axelrod et al. ................ 119/709 |
| 8,235,762 B2 | 8/2012 | Rutherford et al. |
| 2007/0283900 A1 * | 12/2007 | Jager ............................ 119/709 |
| 2009/0038559 A1 | 2/2009 | Markham |
| 2009/0038560 A1 | 2/2009 | Markham |

* cited by examiner

PET TOY WITH CORE ASSEMBLY INCORPORATING NOISE MAKING FEATURE

FIELD OF THE INVENTION

The present invention relates to pet toys, and more particularly, to a pet toy incorporating a core assembly for mounting a noise making device.

BACKGROUND OF THE INVENTION

Chewable pet toys have been available for many years. Rubber or plastic is typically the preferred material for these pet toys. A great variety of shapes can be created since the toys are molded.

One object in many pet toys is to provide various structural features that will keep the pet occupied over a period of time, and one of these features is the incorporation of a noise making device, often referred to as a squeaker. It is believed that an animal's biting action on the toy, which activates the squeaking sound, stimulates the animal to continue with its play/biting action on the toy. However, one observed behavior of animals is that many animals will continue to aggressively chew on the toy to find and eventually destroy the squeaker. Therefore, one significant problem associated with many pet toys is that the animal will specifically target the noise making device, and may inadvertently swallow and ingest the noise making device and surrounding portions of the toy.

Some efforts have been made to isolate the noise making device in a pet toy to prevent access. Some examples of prior art references that disclose pet toys with features intended to isolate the noise making device include the U.S. Pat. Nos. 7,066,779; 7,736,212; and U.S. Pat. No. 7,736,213 to Willinger. According to one embodiment disclosed in these references, a method of mounting a squeaker into a ball toy is provided in which a separate holder or sleeve retains a squeaker and the sleeve is inserted into and held in an opening formed in the toy. The sleeve has a recessed area that tightly mates with the opening. The sleeve can alternatively be formed with fin shaped extensions at a distal end of the sleeve. The extensions enable the noise making element to be retained within the toy even if the bonding of the sleeve to the opening in the toy fails.

Another example of references disclosing a noise producing device held within a pet toy includes the Applicant's prior published applications 2009/0038560 and 2009/0038559. In various embodiments shown in these publications, a noise making device may be secured within the pet toy by use of an internal holding pocket that it is integrally molded when the pet toy is manufactured. A control element may be used to activate or deactivate the noise making device.

Despite these improvements in securing a noise making device within a pet toy, there is still a further need to optimize placement of a noise making device within a pet toy in which the noise making device is effectively isolated from access by the animal, yet the structure surrounding the noise making device can be used to provide additional structural support to the pet toy.

SUMMARY OF THE INVENTION

In accordance with the present invention, a pet toy is provided in which a core assembly incorporates a noise making feature or device. The pet toy has a flexible, elastomeric body that flexes in response to external pressure placed on the toy by an animal. The core assembly extends through the interior of the pet toy and may be secured at opposite ends of the pet toy. The core assembly has a shaft defining a bore and a noise making device is secured to a housing that connects to and extends from the shaft. Airflow is facilitated through the pet toy for activation of the noise making device by deformation of the body of the pet toy. As the pet toy is deformed by the biting action of an animal, air is forced through the noise making device, thereby creating sound.

As used herein, the term "core assembly" refers to an element that is separate from the body of the pet toy, is disposed in the pet toy, and has at least two openings, one opening for fluid communication with a hollow interior of the body of the pet toy and another opening for fluid communication with the exterior of the body of the pet toy. The core assembly may be mounted in an opening formed in the body of the pet toy or between opposing central openings formed in the body of the pet toy. The core assembly provides additional structural support to the pet toy.

In a first embodiment, the pet toy may include a round shaped body with the core assembly extending through the hollow interior of the body. The core assembly may include a pair of flanges located at each end of the core assembly that attach to the sidewall of the body. The central shaft interconnects the flanges. The central shaft defines the bore forming a large opening through the pet toy. As shown, the core assembly extends generally across a diameter of the ball. The noise making device housing is secured to the central shaft, and extends angularly away from an axis of the shaft. A noise making device is mounted in the housing. The flanges are sized to frictionally engage the interior edges of the sidewall defining the central openings. The flanges have peripheral extensions that are shaped to interlock the corresponding shapes of the central openings.

Preferably, the body is made from a flexible and elastomeric material that may include various forms of plastic or rubber. The core assembly can be made of a flexible and elastomeric material having a greater stiffness as compared to the material of the body thereby providing additional rigidity, but still allowing deformation of the sidewall of the body.

As the shape of the body deforms in response to the biting/chewing action of an animal, the volume of air within the hollow interior changes, thus creating a stream of airflow that passes through the noise making device. This travel of air through the noise making device activates its sound making capability. The proximal end of the noise making housing has an opening that communicates with the bore of the central shaft, thereby allowing airflow through the noise making device into the bore. The core assembly provides stiffening support to the body to enable it to rebound to its un-deformed shape after the animal bites down on the body.

In the second preferred embodiment of the invention, the core assembly is defined by a pair of flanges secured to the body of the pet toy, and a compound shaped structure interconnecting the flanges. This interconnecting structure includes a shaft portion connected to one of the flanges, and a bulbous portion connected to the other flange. The shaft portion and bulbous portion connect and extend continuously through the hollow interior of the pet toy. The noise making housing protrudes from the bulbous portion of the core assembly into the hollow interior of the body of the toy. A noise making device is secured within the housing. In this embodiment, activation of the noise making device is achieved in the same way by deformation of the body of the pet toy in which the volume of air within the hollow interior changes as the biting/chewing action occurs, and air is forced through the noise making device in the housing and into the hollow chamber of the interconnecting structure. The flanges have sized openings that communicate with the space outside of the toy allowing air to escape the toy. Preferably, the core assembly in this embodiment is also flexible and elastomeric, and provides support to the body to enable it to more easily rebound to its un-deformed shape in which air travels back into the bore and through the noise making device back into the hollow interior.

In other preferred embodiments of the invention, the shape of the body can be changed. For example, one embodiment may be football shaped, another embodiment may be twig or stick shaped, another embodiment may be ring shaped, and yet another embodiment may be bone shaped. For each of these additional embodiments, the noise making device is secured within the housing, and the housing is disposed within the hollow interior of the body. Further, each of the embodiments includes the central shaft and flanges that are placed on opposite sides of the body and interconnected by the central shaft.

The outer surface of the body may include features that aid in the dental cleaning of the animal's mouth. For example, a series of bumps, protrusions, grooves, or a body with a roughened outer surface can be used. In the second preferred embodiment, it is shown with a series of spaced bumps or protrusions.

Other features and advantages of the invention will become apparent with a review of the drawings, taken in conjunction with the Detailed Description.

DETAILED DESCRIPTION

Figure 1:
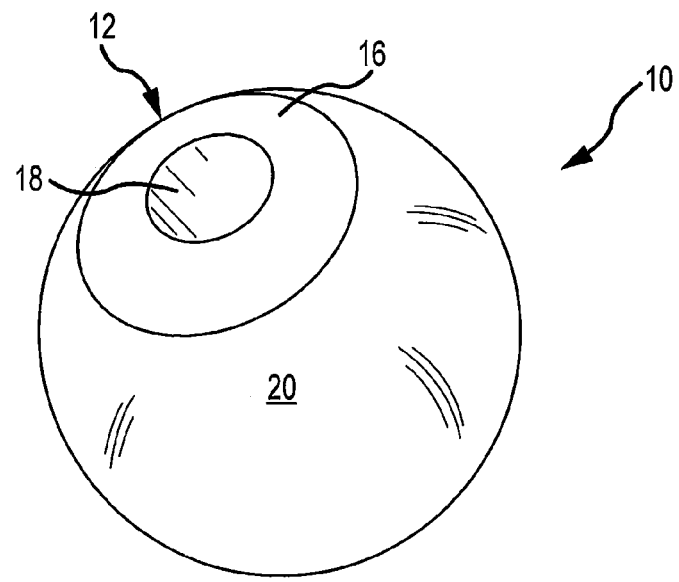
FIG. 1 is a perspective view of a first embodiment of the pet toy.
Figure 2:
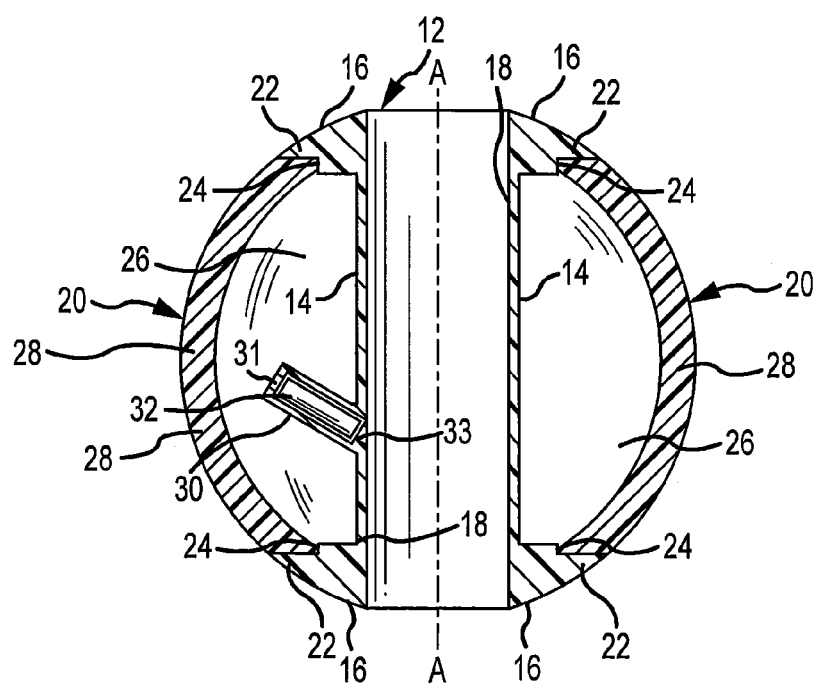
FIG. 2 is a cross sectional view of FIG. 1 showing interior details of the core assembly and noise making housing.

FIGS. 1 and 2 illustrate the pet toy 10 in a first embodiment. The pet toy is characterized by two primary components, namely, a flexible and elastomeric body 20, and a core assembly 12 that is integrated through the hollow interior of the body and extends between the substantially opposite sides or ends of the toy. The core assembly 12 includes a central shaft 14 and a pair of flanges 16 disposed at opposite ends of the shaft. The flanges 16 mate with the sidewall 28 of the pet toy at an opening 24 that extends through opposing sides or ends of the body 20. As shown in FIG. 2, the flanges 16 have a diameter that is greater than a diameter of the central shaft 14.

Each of the flanges includes a peripheral extension 22 that provides mating engagement with the sidewall 28 as shown. As shown in FIGS. 1 and 2, the peripheral extensions 22 extend radially outward beyond a diameter of the central shaft 14 and the extensions 22 extend to an exterior surface of the body 20 to create an approximately flush connection between the flanges 16 and the body. As shown in FIG. 2, the peripheral extensions 22 have a diameter greater than the diameter of the central shaft 14 and greater than a diameter of the opening 24. A central bore 18 defines the open space through the central shaft. The hollow interior 26 of the pet toy provides an open space in which to locate the central shaft 14. A noise making housing 30 has a proximal end 33 connected to the central shaft, and a distal end 31 that extends angularly from the central shaft within the hollow interior 26. As best seen in FIG. 2, the noise making housing 30 extends at an angle approximately 45° to the longitudinal axis A-A of the central shaft. The housing 30 is shown as being a cylindrical shape element. A noise making device 32 is disposed within the housing 30. The distal end 31 of the housing 30 is open, which allows air flow through the housing and through the noise making device. Similarly, the proximal end 33 of the housing 30 that communicates with the central shaft 14 is open which enables the air to escape through the bore 18. Therefore, air can be exchanged from within the hollow interior 26 into the bore 18, and vice versa. The noise making device 32 can be a conventional squeaker used in pet toys in which a vibrating reed generates a noise as air flows around the reed. Other noise making devices can be used, and based on the space available in the hollow interior 26, the housing 30 can be sized and shaped to accommodate the particular noise making device chosen.

As an animal chews or bites on the body 20, the volume of air within the hollow interior 26 will change, therefore forcing air through the noise making device into the bore. As the body returns to its normally un-deformed shape, air will then travel in an opposite direction from the bore through the housing and back into the hollow interior 26. The angular orientation of the housing 30 prevents the interior surface of the sidewall 28 from sealing the air passage through the noise making device if the sidewall contacts the housing during the biting action of the animal. The flexible nature of the connection between the housing 30 and central shaft 14 allows the housing to collapse against the central shaft and therefore the interior surface of the sidewall will not cover the opening at the distal end of the housing.

The central opening 24 is shaped so that a connection is made with the flange 16 at a right angle or 90 degree configuration. The flanges 16 are preferably tapered so that the exterior surface of each flange provides a curved shape that matches the curved exterior shape of the body.

Figure 3:
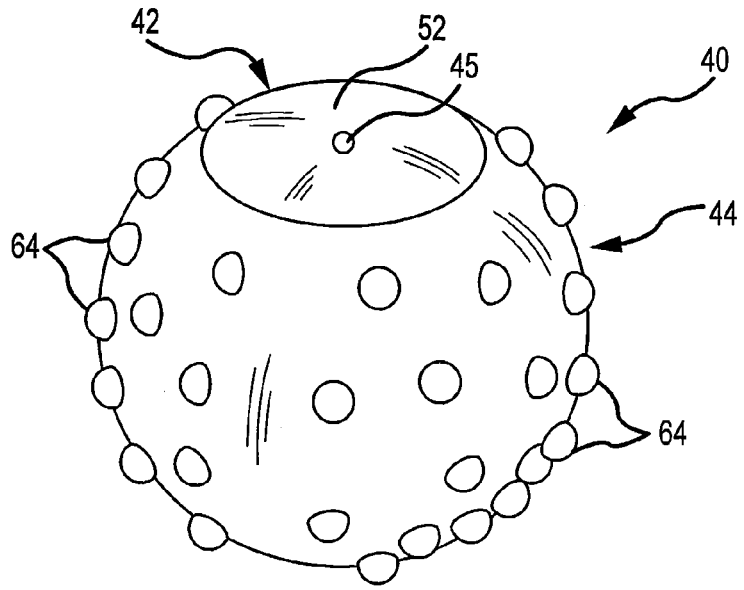
FIG. 3 is a perspective view of a second embodiment of the pet toy.
Figure 4:
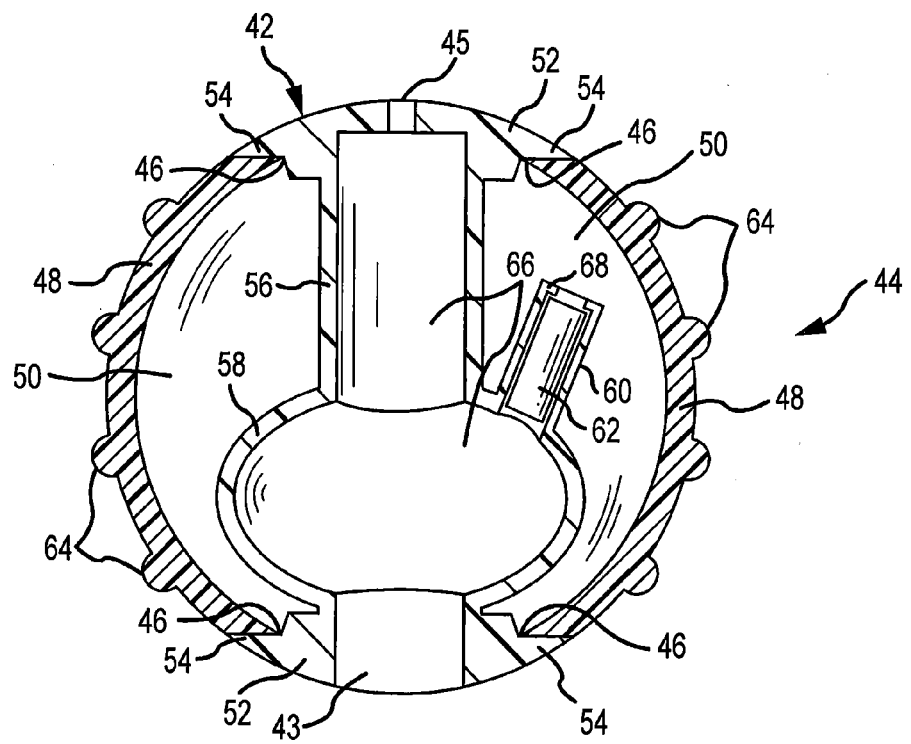
FIG. 4 is a cross sectional view of FIG. 3 showing interior details of the core assembly and noise making housing of the second embodiment.

Referring to FIGS. 3 and 4, a second embodiment of a pet toy 40 is illustrated. The toy 40 also includes a body 44 with a core assembly 42 disposed within the body. The sidewall 48 defines a hollow interior 50. The core assembly 42 has a different configuration in which the central shaft 14 is replaced with a shaft portion 56 and a bulbous portion 58. As also shown, the core assembly has flanges 52 located at opposite ends of the core assembly, and the flanges 52 have respective openings 45 and 43 that communicate with an interior chamber 66. The core assembly 42 is received within central openings 46 formed on opposite sides of the body 44. The flanges 52 also include respective peripheral extensions 54 that create a mating configuration with the sidewall 48.

A noise making device housing 60 protrudes from the core assembly 42, and the housing is cylindrical shaped, as shown, with an interior portion that communicates with an interior chamber 66 that defines the open space within the shaft portion and bulbous portion. A noise making device 62 is placed within the housing 60. The distal end 68 of the housing 60 is open, enabling an exchange of air between the hollow interior 50 of the body 44 and the interior chamber 66. As with the first embodiment, when an animal deforms the shape of the sidewall 48, air will flow through the noise making device thus activating the noise making device to produce sound. The sizes of the openings 43 and 45 can be modified to adjust the desired rate of airflow exchanged between the hollow interior 50 and interior chamber 66. The lower flange 52 shown in FIG. 4 has a relatively larger opening 43 as compared to the smaller opening 45.

FIG. 3 also shows a number of bumps or protrusions 64 representing surface features that can be used to facilitate dental cleaning. It is also contemplated that the surface of the toy may include other features such as a roughened texture, grooves, and combinations thereof.

Figure 5:
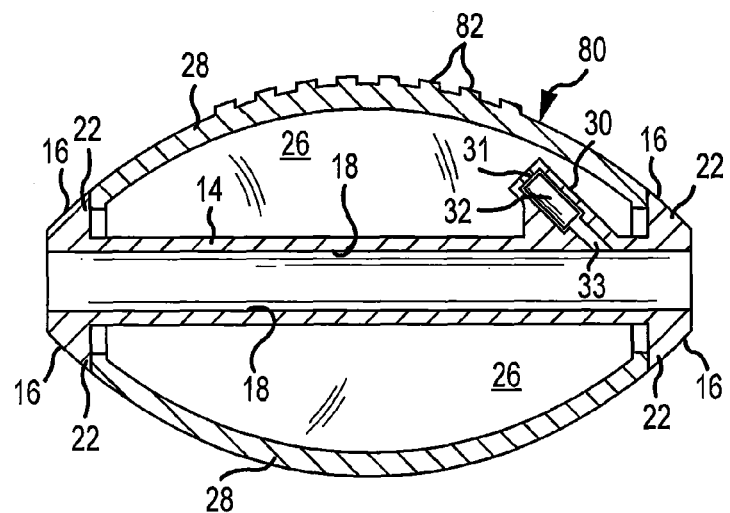
FIG. 5 is a cross sectional view of another embodiment of the pet toy in which the shape of the body is similar to a football.

FIG. 5 illustrates another embodiment in which the body 80 is football shaped. The same reference numbers used in this embodiment correspond to the same structural elements in the previous embodiments. As shown, the football shaped body 80 still provides for a hollow interior 26 in which to place the housing 30. The proximal end 33 of the housing communicates with the central bore 18, while the distal end 31 of the housing communicates with the hollow interior 26 as by corresponding openings in the housing. Bumps or protrusions 82 may simulate laces of the football.

Figure 6:
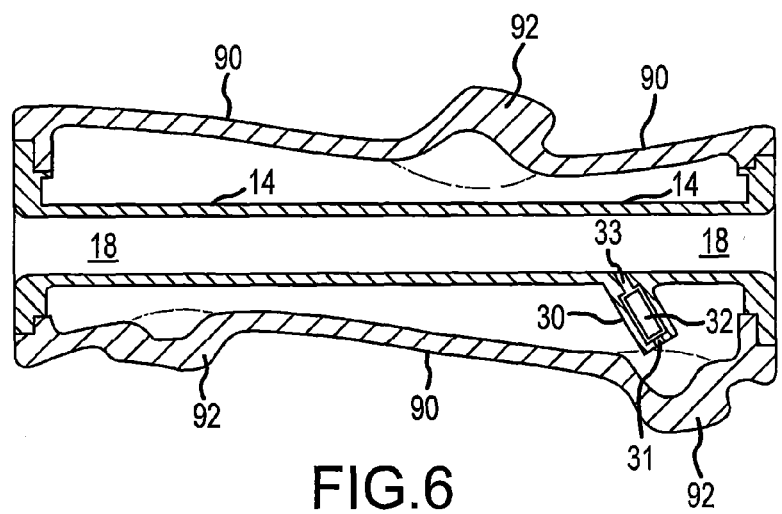
FIG. 6 is a cross sectional view of another embodiment in which the body is shaped as a twig or stick.

Referring to FIG. 6, yet another embodiment is illustrated in which the body 90 is shaped as a stick or twig, including a plurality of protuberances 92 which may simulate broken off portions of the stick/twig shape body 90. The same reference numbers used in this embodiment also correspond to the same reference numbers used in the prior embodiments.

Figure 7:
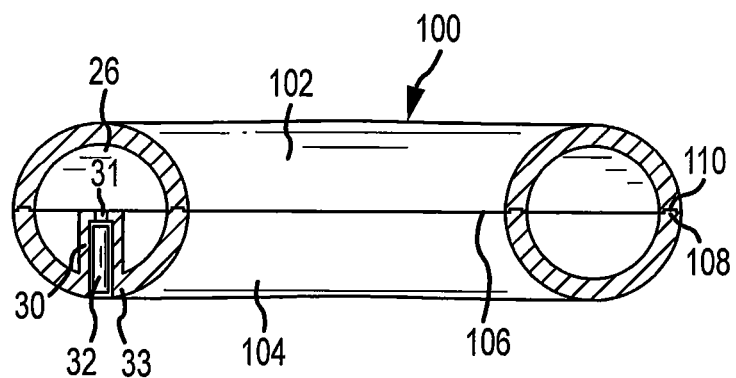
FIG. 7 is a cross sectional view of another embodiment in which the body is ring shaped.

FIG. 7 illustrates yet another preferred embodiment in which the body 100 may be ring shaped. This ring shaped embodiment may include two corresponding halves 102 and 104 that connect one another along line 106. For example, one half 102/104 may have a pair of peripheral grooves 110 while the other half may have a pair of corresponding tongues 108 which fit in the grooves 110. As also shown, the housing 30 is free to protrude within the open interior 26 of the body. One distinction of the embodiment of FIG. 7 is the proximal end 33 of the housing communicates with the exterior surface of the body 100, while the distal end 31 of the housing communicates with the interior open space 26. For this embodiment, it is contemplated that the noise making instrument 32 would be seated deep within the opening in the housing 30 in order to prevent access by the animal.

Figure 8:
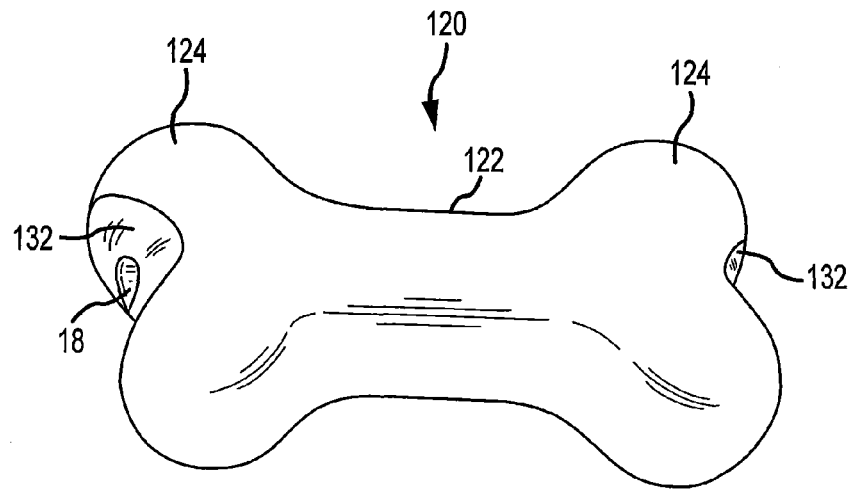
FIG. 8 is a perspective view of another embodiment in which the body is bone shaped.
Figure 10:
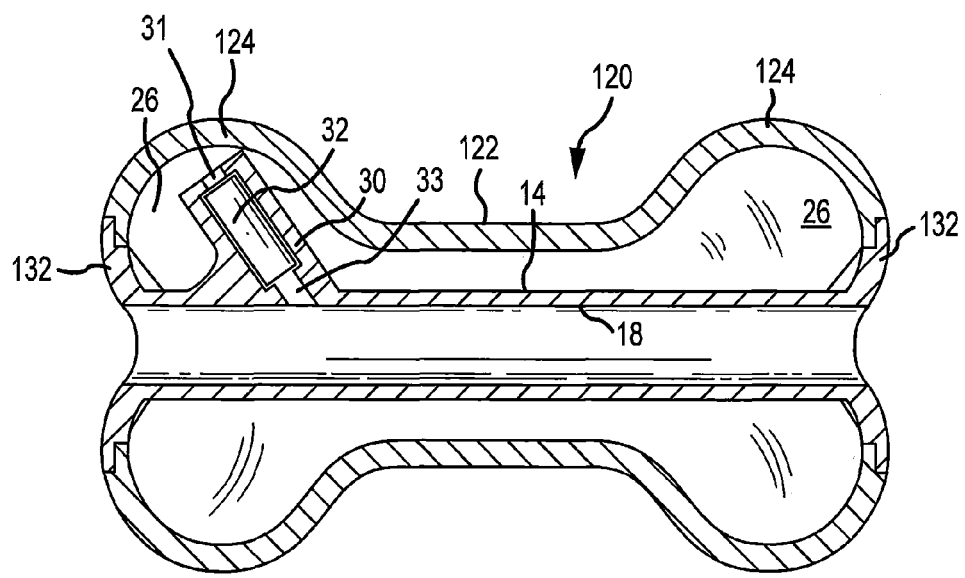
FIG. 10 is a cross sectional view of FIG. 8 showing the interior details of the core assembly and noise making housing of the embodiment.
Figure 9:
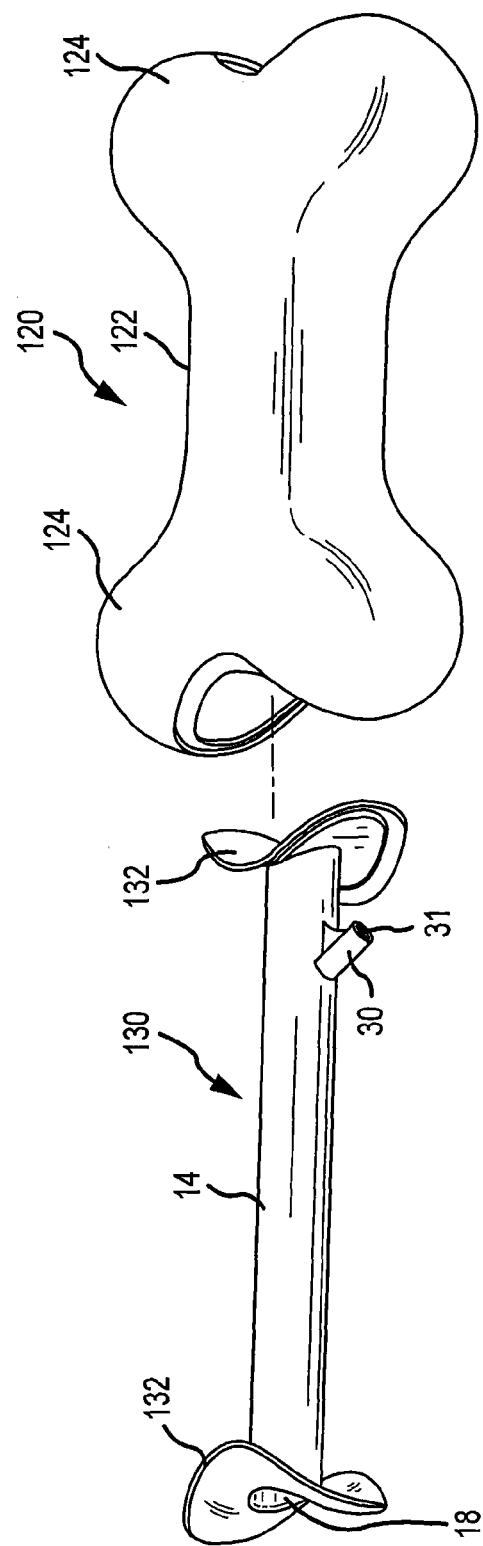
FIG. 9 is an exploded perspective view illustrating the core assembly separated from the body.

Referring to FIGS. 8-10 in a final preferred embodiment, the body 120 is bone shaped including a pair of opposing bulbs or protrusions 124 interconnected by a cylindrical portion 122. Optionally, protuberances, grooves, or ridges (not shown) may be formed on the body. FIG. 9 illustrates the core assembly 130 separated from the body, and also illustrates in better detail the particular shape of the opposing flanges 132 that are located on opposite ends of the central shaft 14. Referring to FIG. 10, again the same reference numbers corresponding to the same structural elements in the previous embodiments, the open space 26 within the body 120 provides ample room for placement of the housing 30. As is evident with the number of different shaped embodiments, the housing 30 can be located so that the housing does not normally make contact with the interior surface of the body. Further, in the event the pet toy is deformed during use, the distal end 31 of the housing is angled so that it will not make flush contact with the interior surface of the housing, thereby enabling air to pass through the housing and noise making device despite deformation of the body.

With the pet toy of the present invention, a durable and functional construction is provided in which a noise making device is completely isolated from access by the animal. The core assembly provides a number of advantages to include not only the mounting of the isolated noise making device, but also provides structural strength to the toy. This additional rigidity allows the sidewall to rebound more readily after being deformed by the biting action of the animal. The body of the toy provides extensive surface area for engagement by the animal's mouth to activate the squeaker in which an adequate deformation along any portion of the sidewall will result in noise being produced by the noise making device. Thus, the noise making feature is facilitated by the construction of the pet toy in which a reduced volume change in the hollow interior of the body causes airflow through the noise making device.

While the flanges may be permanently attached to the sidewall, it is also contemplated that the core assembly could be secured to the body by a friction fit in which the core assembly can be removed in order to replace the noise making device. It is further contemplated that the bore/interior chamber may be modified in size to therefore adjust the pitch and frequency of the sounds produced by the noise making device. Further, it is contemplated that the toy may be sold with a number of different noise making devices that produce different sounds, and may be selected to best stimulate the animal.

The core assembly provides enough area on the central shaft/shaft and bulbous portions so that more than one housing and noise making devices may be used. For example, in FIGS. 2 and 4, it is contemplated that additional noise making housings may be provided on the core assemblies by spacing the additional noise making housings from one another within the hollow interior of the body.

In accordance with the method of the present invention, a pet toy provides stimulating noise by activation of the pet toy in which the isolated noise making device will continually produce a sound as the body of the toy is deformed. Because of the opposing openings on both side of the pet toy, it would be very unlikely that both openings would be blocked to prevent flow of air through the toy. Therefore, according to the method, these opposing openings ensure that the sound will be produced thereby enhancing stimulation for the animal. Also according to the method, deformation of the body will not interfere with the noise making device because the noise making device is flexibly secured to the core assembly and is spaced from the body within the hollow interior. The noise making device can flex or bend along the point at which the housing attaches to the core assembly so in the event of excessive deformation of the body resulting in contact of the interior surface of the sidewall with the housing, the housing can flex or bend to prevent damage to the noise making device. Also, because of the angle at which the housing extends, the housing is not orthogonal to the sidewall and thus deformation of the body causing contact with the housing will not result in the interior surface of the sidewall making flush contact with the opening in the housing. Accordingly, airflow will continue through the opening in the housing despite the deformation experienced along the sidewall.

While the present invention has been set forth with respect to preferred embodiments of an apparatus and method, further changes and modifications may be made to the invention commensurate with the scope of the claims appended hereto.

What is claimed is:

1. A pet toy comprising:
a body having a pair of openings formed in the body, and the body having a hollow interior;
a core assembly placed through the openings, said assembly having a pair of flanges secured in said openings, each of said flanges forming a portion of an exterior surface of the pet toy and each of said flanges extending radially outward beyond said pair of openings on said exterior surface, a shaft interconnecting the flanges, said shaft having a bore extending through the hollow interior of the pet toy, each of said flanges having an opening extending from the exterior surface of the pet toy to the bore of said shaft, and a housing secured to the shaft, said housing having a distal end protruding from the shaft within the hollow interior; and
a noise making device secured in said housing, wherein deformation of the body forces air from the hollow interior, through the noise making device, and into the bore of said shaft, thereby producing sound.

2. The pet toy, as claimed in claim 1, wherein:
said pair of openings is disposed on substantially opposite sides of said pet toy.

3. The pet toy, as claimed in claim 1, wherein:
said shaft is cylindrical shaped and interconnects said pair of flanges.

4. The pet toy, as claimed in claim 1, wherein:
said shaft extends along a longitudinal axis, and said housing extends from said shaft at an angle relative to said longitudinal axis.

5. The pet toy, as claimed in claim 4, wherein:
said angle at which said housing extends from the longitudinal axis is approximately 45 degrees.

6. The pet toy, as claimed in claim 1, wherein:
said body is made of a flexible and elastomeric material, and said core assembly is made of a flexible and elastomeric material having a greater stiffness as compared to the material of the body.

7. The pet toy, as claimed in claim 1, wherein:
said noise making device is a squeaker.

8. The pet toy, as claimed in claim 1, wherein:
each of the pair of flanges is tapered and has an exterior surface with a curved shape to match a curvature of the exterior surface of the body;
a first of the pair of flanges having a peripheral extension that is shaped to provide mating engagement with an edge of a first of the pair of openings; and
a second of the pair of flanges having a peripheral extension that is shaped to provide mating engagement with an edge of a second of the pair of openings.

9. The pet toy, as claimed in claim 1, further comprising:
each of said openings having an interior edge, wherein said pair of flanges are frictionally received in the interior edges of said openings.

10. The pet toy, as claimed in claim 1, wherein:
said body has a sidewall of a substantially uniform thickness.

11. The pet toy, as claimed in claim 1, wherein:
said body is spherical shaped.

12. A pet toy, as claimed in claim 1, wherein:
said body is football shaped.

13. A pet toy, as claimed in claim 1, wherein:
said body is twig shaped including a plurality of protuberances extending from said body.

14. A pet toy, as claimed in claim 1, wherein:
said body is bone shaped including a pair of opposing protrusions interconnected by a cylindrical portion.

15. A pet toy comprising:
a body having a pair of openings formed in the body, and the body having a hollow interior;
means for securing a noise making device within said body, said means for securing including a shaft and a housing flexibly connected to the shaft at a proximal end, said housing having a distal end extending from said shaft at an oblique angle, openings formed at each of the distal end and the proximal end of said housing, said shaft extending from the exterior surface at a first of said pair of openings through the hollow interior of said body to the exterior surface at a second of said pair of openings, said shaft defining a bore that forms an opening through the pet toy, said means for securing further including a pair of flanges connected to ends of said shaft, said pair of flanges each extending radially outward beyond said pair of openings and forming at least a portion of an exterior surface of said pet toy; and
a noise making device secured in said housing, wherein deformation of the body forces air from the hollow interior, through the openings formed in said housing, through the noise making device, and into an open space of said means for securing thereby producing sound.

16. A core assembly for connection with a pet toy comprising:
a shaft portion configured to connect with an opening formed in a body of the pet toy, said shaft portion having an internal chamber defining an open space;
a flange interconnected to said shaft portion, said flange extending around said shaft portion, said flange having an opening to said internal chamber of said shaft portion, said flange including a peripheral extension having a diameter greater than a diameter of the opening formed in the body of the pet toy, said peripheral extension configured to contact an exterior surface of said body; and
a noise making device housing secured to said shaft portion such that said housing and said shaft portion do not share a common axis, said housing extending from said shaft portion at an oblique angle, said housing having a hollow interior and a distal end with an opening, said hollow interior being in fluid communication with the internal chamber of said shaft portion, and wherein said shaft portion allows said housing to collapse against said shaft portion.

17. The core assembly, as claimed in claim 16, wherein:
said shaft portion is cylindrical shaped.

18. The core assembly, as claimed in claim 16, wherein:
said opening comprises two openings, and wherein said shaft portion connects to the two openings formed in the body of the pet toy.

19. A pet toy comprising:
a body having an exterior surface, a hollow interior, and at least one opening formed in the body;
a core assembly disposed in the hollow interior of said body, the core assembly comprising a shaft portion and a noise making device housing secured to said shaft portion, at least one flange connected to said shaft portion, said at least one flange extending radially outward beyond said at least one opening and contacting said exterior surface, said at least one flange forming a portion of an exterior surface of the pet toy, said shaft portion having an internal cavity defining an open space, said housing extending angularly away from an exterior surface of said shaft portion relative to a longitudinal axis of said shaft portion such that the housing is not orthogonal to a sidewall of the body; and a noise making device secured in said housing, wherein deformation of the body forces air from the hollow interior of the body, through an opening in a distal end of said housing, through the noise making device and into the internal cavity of said shaft portion thereby producing sound.

20. The pet toy, as claimed in claim 19, wherein:
said shaft portion is cylindrical shaped.

21. The pet toy, as claimed in claim 19, wherein:
said at least one opening comprises two openings, and wherein said shaft portion connects to the two openings formed in the body of the pet toy.

22. A pet toy comprising:
a body, said body having an exterior surface, a hollow interior, and a pair of openings therethrough;
a core assembly placed through the pair of openings, said core assembly having a shaft extending through the hollow interior of said body, said shaft having a bore defining an opening through the pet toy, a pair of flanges extending from said shaft, each of said flanges having a peripheral extension sized to engage one of the pair of openings, each of said peripheral extensions creating an approximately flush connection between each of said flanges and the body, and a housing flexibly secured to said shaft, said housing extending from said shaft at an oblique angle; and
a noise making device secured in said housing, wherein deformation of said body forces air from the hollow interior through said noise making device and into said bore of said shaft, thereby producing sound.

* * * * *

UNITED STATES PATENT AND TRADEMARK OFFICE
CERTIFICATE OF CORRECTION

PATENT NO. : 8,978,590 B2  Page 1 of 1
APPLICATION NO. : 12/904894
DATED : March 17, 2015
INVENTOR(S) : Sam Nunn and Zhan Feng Chen It is certified that error appears in the above-identified patent and that said Letters Patent is hereby corrected as shown below:

In the Claims

Claim 13, Column 7, Lines 63-64: DELETE "proturbances" and INSERT -- protuberances --

Signed and Sealed this
Eleventh Day of August, 2015

Michelle K. Lee
*Director of the United States Patent and Trademark Office*